United States Patent [19]
Muntjanoff

[11] 3,722,916
[45] Mar. 27, 1973

[54] MOUNTING ARRANGEMENT FOR FLEXIBLE MEMBERS

[75] Inventor: John R. Muntjanoff, Aurora, Ill.
[73] Assignee: Caterpillar Tractor Co., Peoria, Ill.
[22] Filed: Dec. 10, 1971
[21] Appl. No.: 206,661

[52] U.S. Cl. .....................280/421, 180/51, 248/75
[51] Int. Cl. ...............................................B60d 1/08
[58] Field of Search ....280/421, 422; 180/51; 248/75

[56] References Cited

UNITED STATES PATENTS

| | | | |
|---|---|---|---|
| 2,626,552 | 1/1953 | Oehler et al. | 280/421 |
| 2,948,450 | 8/1960 | Dobrikin | 224/42.1 |
| 2,996,315 | 8/1961 | Roth et al. | 285/2 X |
| 3,253,671 | 5/1966 | Fielding | 180/51 |
| 3,279,822 | 10/1966 | Orendorff | 280/421 |

*Primary Examiner*—Leo Friaglia
*Attorney*—Warren J. Krauss et al.

[57] ABSTRACT

An improved mounting arrangement for flexible members such as flexible hoses which extent between the front and rear sections of an articulated vehicle which has a center hitch member to permit limited relative swinging movement of the sections in a horizontal plane about a vertical axis and to permit limited relative rotation about a horizontal axis in a vertical plane. The arrangement includes a first clamp which attaches the hoses to the front section and a second clamp which attaches the hoses to the hitch member in a manner which provides sufficient slack in the hoses to form a collapsible loop between the front section and the hitch member which loop resides in a plane substantially normal to the vertical axis. A third clamp attaches the hoses to the rear section of the vehicle so as to form a travelling loop between the hitch member and the rear section which resides in a plane substantially normal to the horizontal axis of the hitch.

13 Claims, 4 Drawing Figures

Patented March 27, 1973  3,722,916
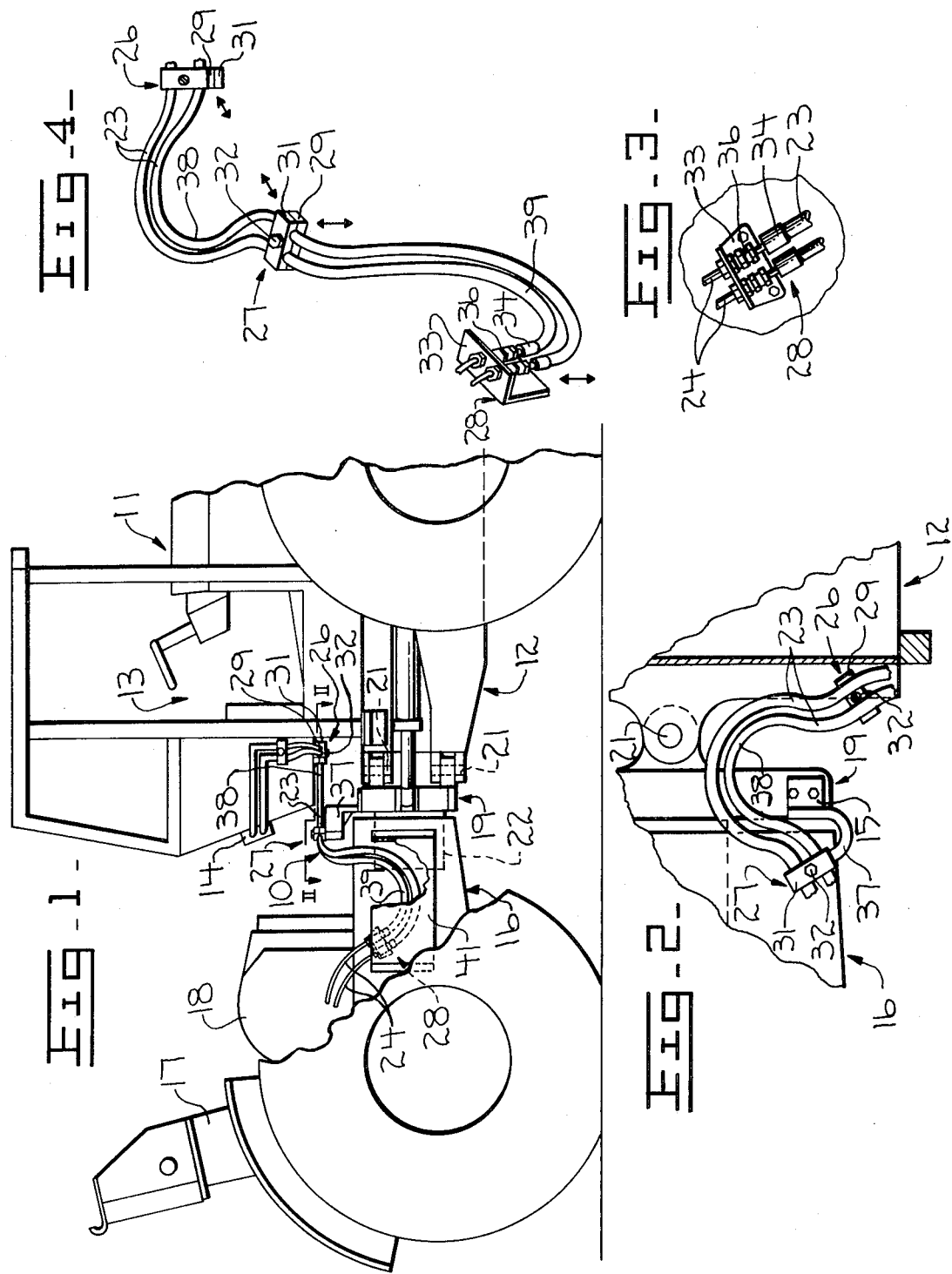
INVENTOR
JOHN R. MUNTJANOFF
BY
Fryer, Tjensvold, Feix, Phillips & Lempio
ATTORNEYS

3,722,916

MOUNTING ARRANGEMENT FOR FLEXIBLE MEMBERS

BACKGROUND OF THE INVENTION

This invention relates to a hose mounting arrangement for flexible hoses and the like such as those which extend between the front and rear body sections of an articulated vehicle of the type employed in earthmoving and forestry operations. A substantial number of such vehicles have their front and rear frames connected through a hitch member which affords compound relative movement between the frames about both a vertical axis and a horizontal axis.

One of the problems encountered with such vehicles is that of crossing the hydraulic hoses between the front and rear frames. The hoses are typically attached to the front and rear frames to form a single slack loop between the frames which allows relative rotation of the frames about both the vertical and horizontal axes. With such an arrangement, however, the hoses are subjected to both bending and twisting stresses as the frames rotate relative to one another about the vertical and horizontal axes. Although the hydraulic hoses utilized are designed to withstand repetitive bending, the extant repetitive twisting can cause premature failure. An even earlier failure could result if both bending and twisting stresses occured in the same section of hose.

In other instances, a swivel means is incorporated between one frame and the center hitch member to take the rotation in one plane while a loop in the hose is provided to accommodate rotation in the other plane. However, such an arrangement is costly and the swivel means available have a propensity toward leakage, especially under the severe usage normally encountered in earthmoving and forestry operations.

SUMMARY AND OBJECTS OF THE INVENTION

This invention provides an improved mounting arrangement which utilizes spaced, first and second hose mounting members forming the hoses between them into a collapsible loop which is disposed in a first predetermined plane and a third mounting member disposed in spaced relation from the second clamping member forming a travelling loop in the hoses therebetween in a plane normally disposed with respect to the first predetermined plane.

A primary object of this invention is to provide an improved mounting arrangement for flexible members such as hydraulic hoses which extend between a plurality of relatively movable sections of an apparatus so as to minimize the possibility of fatigue failure of such members.

Another object of this invention is to provide an improved mounting arrangement which is capable of forming and retaining the hoses in multi-planar looped configurations which can accommodate externally imposed compound multidirectional bending moments and thus extend the useful life of the hoses.

Other objects and advantages of the present invention will become readily apparent upon reference to the accompanying drawings and following description.

BRIEF DESCRIPTION OF THE DRAWINGS

FIG. 1 is a side elevational view of a mounting arrangement for flexible members embodying the principles of the present invention. The arrangement is shown mounted upon an articulated vehicle with portions thereof broken away for illustrative convenience.

FIG. 2 is a somewhat enlarged fragmentary plan view of the mounting arrangement taken generally along the line II—II of FIG. 1.

FIG. 3 is a somewhat enlarged fragmentary elevational view of the portion of the mounting arrangement shown in FIG. 1.

FIG. 4 is an isometric partial view of the mounting arrangement shown in FIG. 1.

DESCRIPTION OF THE PREFERRED EMBODIMENT

Referring to the drawings, a mounting arrangement embodying the principles of the present invention is generally indicated by the reference numeral 10 in association with an articulated vehicle 11 which may be of any type having flexible lines or hoses crossing a centrally disposed pivot area. More specifically, the vehicle illustrated has a front body section 12 which supports an operator's station 13 and a hydraulic control valve 14 mounted upon the rear portion of the operator's station. The front body section also supports an engine and a hydraulic pump, which elements are not shown.

The vehicle 11 has a rear body section 16 which mounts a logging arch 17 and a hydraulically operated winch 18 for use in logging operations. Other implements, such as hydraulically controlled grapples and the like, may be mounted upon the rear body section in place of the logging arch, if desired.

The front and rear body sections 12 and 16 are interconnected by a hitch assembly 19 of the type which is fully disclosed in United States Patent application Ser. No. 152,511, filed June 14, 1971, and of common assignment with this application. The hitch assembly 19 is pivotally connected to the front body section by vertically disposed and aligned pivot pins 21 which facilitate steering of the vehicle in a conventional manner. The hitch assembly 19 is connected to the rear body section 16 by means of a horizontally disposed pivot connection 22 which allows the body sections to oscillate vertically thereabout with respect to one another when the vehicle is traversing uneven terrain.

A plurality of elongated flexible members such as hydraulic hoses 23 extend between the front and rear body sections 12 and 16 and, together with relatively rigid conduits 24 mounted upon the rear body section, communicate hydraulic fluid to the winch or other rear-mounted, hydraulically actuated implements.

The hydraulic hoses 23 extend rearwardly from the hydraulic control valve 14 and are supported by the hose mounting arrangement 10, which includes first, second, and third mounting block means 26, 27 and 28, respectively.

The first and second mounting or clamping blocks 26 and 27 are substantially identical and each includes a base portion 29, a clamp portion 31 and a fastening means, such as bolt 32. The hydraulic hoses 23 are disposed between the base portion 29 and clamp portion 31 and are firmly clamped in place by means of tightening the bolt 32. Each of the bolts 32 also secures its respective mounting block to its associated body section of the vehicle.

As more clearly shown in FIG. 3, the third mounting block 28 includes a bracket means 33 which is secured to a side portion of the rear body section 16. An adapter fitting 34 is secured to the end portion of each of the hoses 23 and is connected to a coupling member 36 which is, in turn, secured to the bracket means 33 and to each of the conduits 24.

The first mounting block 26 fastens the hoses 23 to the front body section 12 and the second mounting block 27 attaches the hoses to a bracket member 37 suitably secured at 15 to a portion of the hitch assembly 19. Sufficient slack is provided in the hoses for the formation of a collapsible loop 38 between the first and second mounting blocks. The loop lies within a plane which is substantially normal to the vertically disposed pivot pins 21.

The third mounting block 28 attaches the hoses to the rear body section 16 in predetermined spaced relation to the second mounting block 27 to form a loop 39 in the hoses which is spaced between the hitch assembly and the rear body section. Loop 39 lies primarily in a plane which is generally parallel to the horizontal pivot connection means 22. Thus, the planes of the loops 38 and 39 are substantially normal with respect to one another. A guard member 41 is secured to a side portion of the rear body section to provide protection for the loop 39 from sticks, brush, and other debris.

OPERATION

While the operation of the present invention is believed to be apparent from the foregoing description, amplification will be made in the interest of absolute clarity. When the vehicle is in operation, steering is accomplished in a conventional manner whereby swinging motion in a horizontal plane occurs between the front body section 12 and the center hitch assembly 10 about the vertical pivot pins 21. This swinging motion causes the first and second mounting blocks 26 and 27 to move toward or away from each other, as indicated by arrows in FIG. 4, in a plane, or planes, perpendicular to the vertical axis. It should be noted at this point that, depending upon the particular arrangement, the pivots about which the body sections oscillate need not be disposed in strictly vertical and horizontal planes. Other planes could be utilized so long as the hose loops are disposed in planes normal thereto. When the vehicle is steered in one direction, the collapsible loop 38 collapses as the first and second mounting blocks move toward one another. When the vehicle is steered in the opposite direction, the collapsible loop tends to straighten as the first and second mounting blocks move away from each other. In both of these operations, the hose is exposed only to bending moments and is not subjected to twisting forces.

When the vehicle is traversing uneven terrain, limited relative vertical movement occurs between the center hitch assembly 19 and the rear body section 16 whereby the second mounting block 27 and the third mounting block 28 move up or down, as indicated by arrows on FIG. 4, in spaced-apart planes which are perpendicular or normal to the axis of the horizontal pivot connection 22. As such vertical motion occurs, the second and third mounting blocks move in opposite directions about the horizontal connection toward and away from one another causing the travelling loop 39 to move with respect to the mounting blocks. The curvature of the travelling loop 39 remains substantially uniform.

The travelling loop is provided to accommodate the rotational or vertical relative movement between the hitch assembly and the rear body section which movement occurs about the horizontal connection 22. This minimizes any tendency resulting from such motion to transmit torquing moment to the hoses and permits only the imposition, if any, of bending moments upon the hose.

In view of the foregoing, it is apparent that the structure of the present invention provides an improved hose mounting arrangement for attaching hydraulic hoses to the front body section, hitch member and rear body section of an articulated vehicle in a manner which allows the formation of a pair of loops in the hydraulic hose with one loop being disposed in a plane which accommodates rotational movement about a vertical pivot axis and a second loop which accommodates rotational movement about a horizontal pivot axis. With the hoses mounted in this manner, they are not subjected to repetitive twisting as the body sections rotate with respect to each other.

While the invention has been described and shown with particular reference to the preferred embodiments, it will be apparent that variations and modifications are possible and that such variations and modifications would fall within the spirit of the present invention and the scope of the appended claims.

What is claimed is:

1. A mounting arrangement for attaching a flexible hose to an apparatus having a plurality of sections interconnected for multi-planar rotational and angular movement comprising;
    first means attaching said hose to a first of said sections;
    second means attaching said hose to a second of said sections and forming a loop in said hose between said first and second means to accommodate angular movement between said first and second sections; and
    third means for attaching said hose to a third of said sections forming a loop in said hose between said second and third means to accommodate rotational movement between said second and third sections.

2. A mounting arrangement for attaching an elongated flexible member to an apparatus having first and second sections interconnected by a center member for limited relative swinging motion about a first axis and for limited relative rotation about a second axis which axis is perpendicular to said first axis comprising;
    first mounting means attaching said flexible member to said first section;
    second mounting means spaced from said first mounting means and attaching said flexible member to said center member to form a first collapsible loop in said flexible member between said first section and said center member, said first collapsible loop being disposed in a plane substantially perpendicular to said first axis; and
    third mounting means for attaching said flexible member to said second section to form a second loop in said flexible member between said center member and said second section, said second loop being disposed in a plane substantially parallel to said second axis and angularly disposed with respect to the plane of said first collapsible loop.

3. The invention of claim 2 wherein said flexible elongated member is a flexible conduit.

4. The invention of claim 3 wherein said flexible conduit is a fluid conveying hose.

5. A mounting arrangement for attaching a flexible hose to an articulated vehicle having a first body section and a second body section interconnected by a center hitch member for limited relative swinging motion between the first section and the center hitch member about a vertical axis and for limited relative rotation between the center hitch member and the second section about a longitudinally aligned horizontal axis comprising;

a first mounting block removably secured to said first body section for attaching said hose to said first section, said first mounting block being movable in a plane which is perpendicular to said vertical axis as relative swinging motion occurs between said first section and said center hitch member;

a second mounting block removably secured to said center hitch member for attaching said hose to said center hitch member and for forming a collapsible loop in said hose between said first and second mounting blocks, said second mounting block being movable in a plane which is perpendicular to said vertical axis as relative swinging motion occurs between said first section and said center hitch member and being movable in a plane which is perpendicular to the horizontal axis as relative rotation occurs between the center hitch member and said second section whereby said first mounting block and said second mounting block move toward and away from each other; and a third mounting block for attaching said hose to said first section and for forming a loop in said hose between said second and third mounting blocks, said third mounting block being movable in a plane which is perpendicular to said horizontal axis and which is parallel to the plane in which said second mounting block moves as relative rotation occurs about said horizontal axis between said hitch member and said second section.

6. The mounting arrangement of claim 5 wherein said first and second mounting blocks comprise;

a base portion disposed adjacent its associated section;

a clamp portion disposed adjacent said base portion with said hose disposed therebetween; and a bolt means for securing said mounting blocks to their associated sections such that said hose is clamped between said base portion and said clamp portion.

7. The mounting arrangement of claim 5 wherein said third mounting block comprises;

a bracket means mounted upon said second section;

a coupling means secured to said bracket means; and an adapter means connected to said coupling means and to a portion of said hose whereby said hose can be readily connected or disconnected from said bracket means.

8. A mounting arrangement for mounting a flexible member upon a pair of relatively movable bodies interconnected by a hitch member, which bodies move relative to one another in a plurality of different planes, comprising; attaching means including separate clamping members on each of said bodies and on said hitch member for slackly attaching said flexible member to each of said pair of bodies and to said hitch member so as to permit bending flexure of said flexible member without the imposition of a twisting moment upon said flexible member.

9. The invention of claim 8 wherein said bodies move relative to one another within both a substantially vertical plane and a substantially horizontal plane and wherein said attaching means allows bending flexure of said flexible member within each of said planes without the imposition upon said flexible member of a twisting moment.

10. The invention of claim 9 wherein said flexible member is formed into a first slack loop configuration between two of said clamping members.

11. The invention of claim 10 wherein said first slack loop configuration lies substantially completely within a first single plane.

12. The invention of claim 11 wherein said clamping member attached to said hitch member coacts with one other of said separate clamping members to form said flexible member into a second slack loop configuration.

13. The invention of claim 12 wherein said second slack loop configuration lies substantially completely within a second single plane.

* * * * *